United States Patent [19]

Kent et al.

[11] Patent Number: 5,185,725
[45] Date of Patent: Feb. 9, 1993

[54] DIVER LOCATOR SYSTEM

[75] Inventors: Brian P. Kent, Cyprus; Charles M. Dube, Redondo Beach, both of Calif.

[73] Assignee: Dynamics Technology, Inc., Torrance, Calif.

[21] Appl. No.: 863,401

[22] Filed: Apr. 3, 1992

[51] Int. Cl.$^5$ .............................................. H04B 1/59
[52] U.S. Cl. ...................................... 367/6; 367/129; 367/153; 367/910
[58] Field of Search ...................... 367/2, 5, 6, 99, 107, 367/111, 117, 125, 127, 129, 131, 910, 153; 114/315; 405/185, 189; 441/11, 13, 16; 340/850; 342/22, 42, 51, 58, 419

[56] References Cited

U.S. PATENT DOCUMENTS

| | | | |
|---|---|---|---|
| 3,860,900 | 1/1975 | Scudder | 367/2 |
| 3,944,967 | 3/1976 | Acks et al. | 340/6 R |
| 4,176,338 | 11/1979 | Spindel et al. | 367/3 |
| 4,604,733 | 8/1986 | Brown et al. | 367/2 |
| 5,008,860 | 4/1991 | Riley et al. | 367/6 |

Primary Examiner—Brian S. Steinberger
Attorney, Agent, or Firm—Freilich Hornbaker & Rosen

[57] ABSTRACT

An underwater location system (16) is disclosed having a plurality of locator modules (18), each capable of finding the relative range and bearing of other modules. The modules may be diver mounted, placed on movable objects such as a boat (14) or on fixed positions such as the sea floor (12). Range and bearing to each module of the system is displayed, upon request, on a console (20) which may be hand held or mounted in a diver's instrument console. Each module can interrogate other modules with an acoustic pulse which is answered, after a unique time delay stored in each module, by an acoustic response pulse. Response pulse sources are identified by their arrival in a time detection window set by their unique time delay. Range to each identified transponder source is calculated from a receipt time within each detection window. A set of spaced receive hydrophones (28) provides signals whose measured phase difference is combined with a stored phase-to-bearing lookup table to obtain bearing of the identified transponder source.

19 Claims, 5 Drawing Sheets

DIVER LOCATOR SYSTEM

FIELD OF THE INVENTION

This invention relates to systems useful by a group of underwater divers for supplying information to each diver identifying his location relative to a fixed point and/or the location of each other diver in the group.

Such location information facilitates the diver's ability to navigate and enhances both individual and group safety. Prior systems for supplying diver navigation information are addressed in U.S. Pat. Nos. 3,944,967 and 4,604,733.

SUMMARY OF THE INVENTION

A system in accordance with the invention contemplates that each diver carries a locator module operable to transmit an omnidirectional interrogation pulse, e.g. acoustic. Each other locator module responds to the interrogation pulse by issuing a response pulse. The interrogating locator module then processes each response pulse and displays information identifying the range and/or bearing of each locator module which issued a response pulse.

In accordance with a preferred embodiment of the invention, each locator module is assigned a unique time delay interval which enables the interrogating module to distinguish between response pulses issued by multiple responding modules.

A preferred locator module in accordance with the invention is characterized by transmitting and receiving transducers, signal processing means, and information display means. The transmitting transducer is preferably configured to transmit a substantially omnidirectional interrogation pulse.

A preferred locator module in accordance with the invention includes an array of spaced receiving transducers, e.g. hydrophones, arranged so that the phase of a received response pulse differs at each receiving transducer, thus enabling the bearing of the response pulse source to be determined. In accordance with a preferred signal processing means, bearing is determined by executing a look-up operation in a digitally stored phase-to-bearing table.

The interrogating locator module determines the range of each responding locator module based upon the transit time of the interrogation and response pulses, as well as the unique time delay assigned to the responding module.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
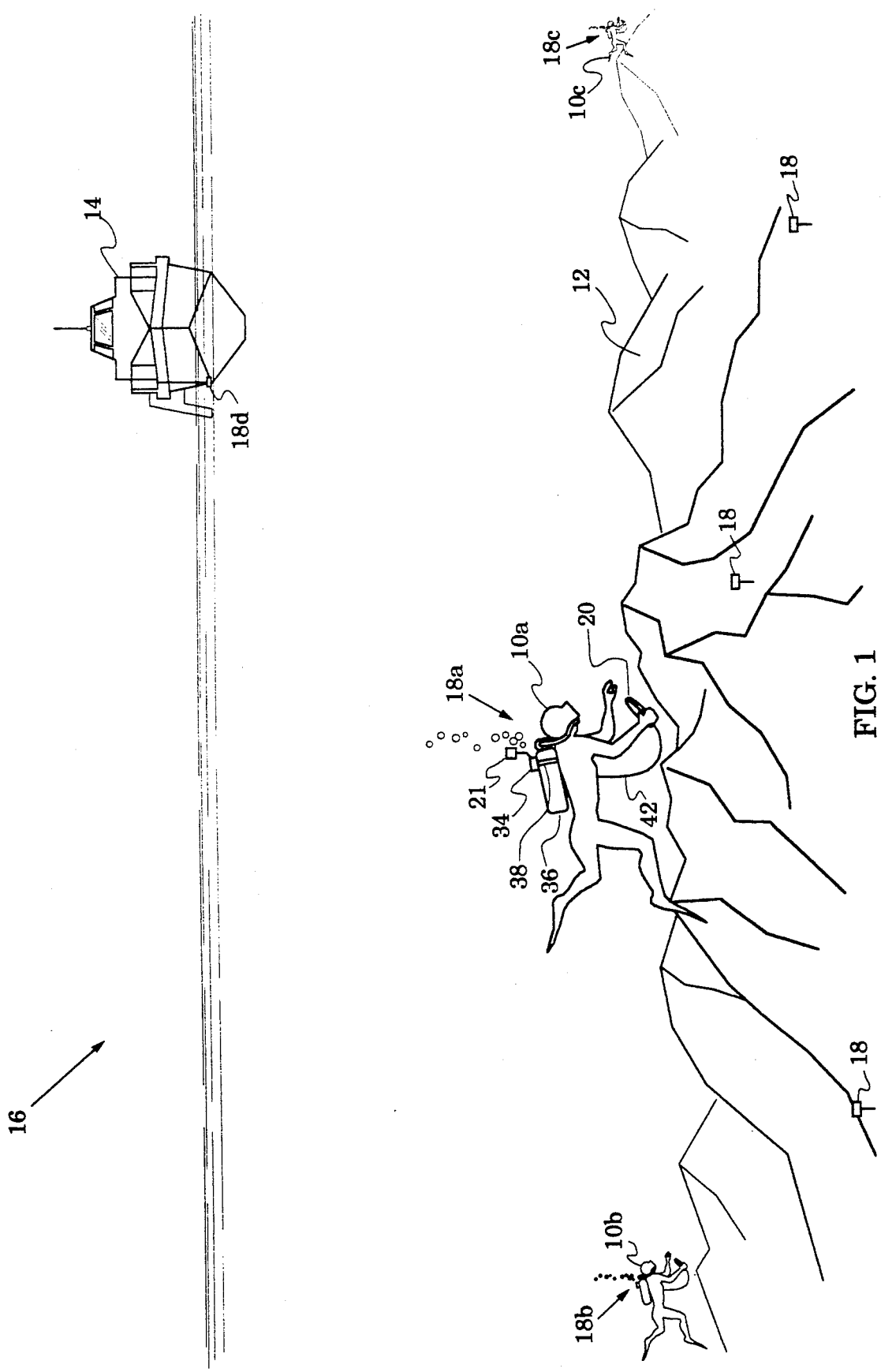
FIG. 1 is a perspective view of a system of preferred locator module embodiments, in accordance with the present invention, being used to observe relative range and bearing between a group of divers and their boat.

FIG. 1 is a perspective view of a group of divers 10 exploring the sea floor 12 beneath their dive boat 14. Their exploration is aided, in accordance with the present invention, by a system 16 of diver locator modules 18 which enables each of the divers 10 to observe, relative to himself, the range and bearing of the other divers and of the boat 14.

For example, with the system 16 the diver 10a can glance at his locator module display 20 and learn (with an approximation due to the system accuracy) that his companion diver 10b is 200 feet distant at "7 o'clock" and his companion diver 10c is 450 feet distant at "9 o'clock" while the boat 14 is 75 feet distant at "11 o'clock". Such location information enhances the safety and effectiveness of diving, especially in poor visibility conditions. Additional locator modules 18 may be placed on the sea floor 12 and included in the system to allow the divers 10 to locate themselves relative to these fixed positions.

In accordance with the invention, a diver, such as the diver 10a, commands his locator module 18a to transmit a signal, via a transducer 21, to interrogate other modules 18. Each interrogated module 18 acts as a transponder by transmitting a response signal via its own transducer. Each response pulse preferably carries identification information which uniquely identifies the transponder module. Although such identification information can take many different forms, in accordance with the preferred system embodiment each module is assigned a unique response time delay.

The interrogating locator module 18a calculates the relative range of each identified transponder source by means of the interrogation signal and associated response signal transit time. The transducer 21 has, at least for receive purposes, a plurality of spaced portions enabling the interrogating locator module 18a to calculate the relative bearing of each identified transponder source based on characteristics of the associated response signal at each transducer portion.

In accordance with the invention, the interrogation and response signals may be pulses in any energy form suitable for underwater propagation (e.g. acoustic, electromagnetic, light). The word pulse is used here to indicate any recognizable signal and is not intended to restrict the form, shape or duration of such a signal. The signal may carry any code suitable for unique identification of each transponder source (e.g. time delay, frequency offset, pulse code modulation).

Figure 2:
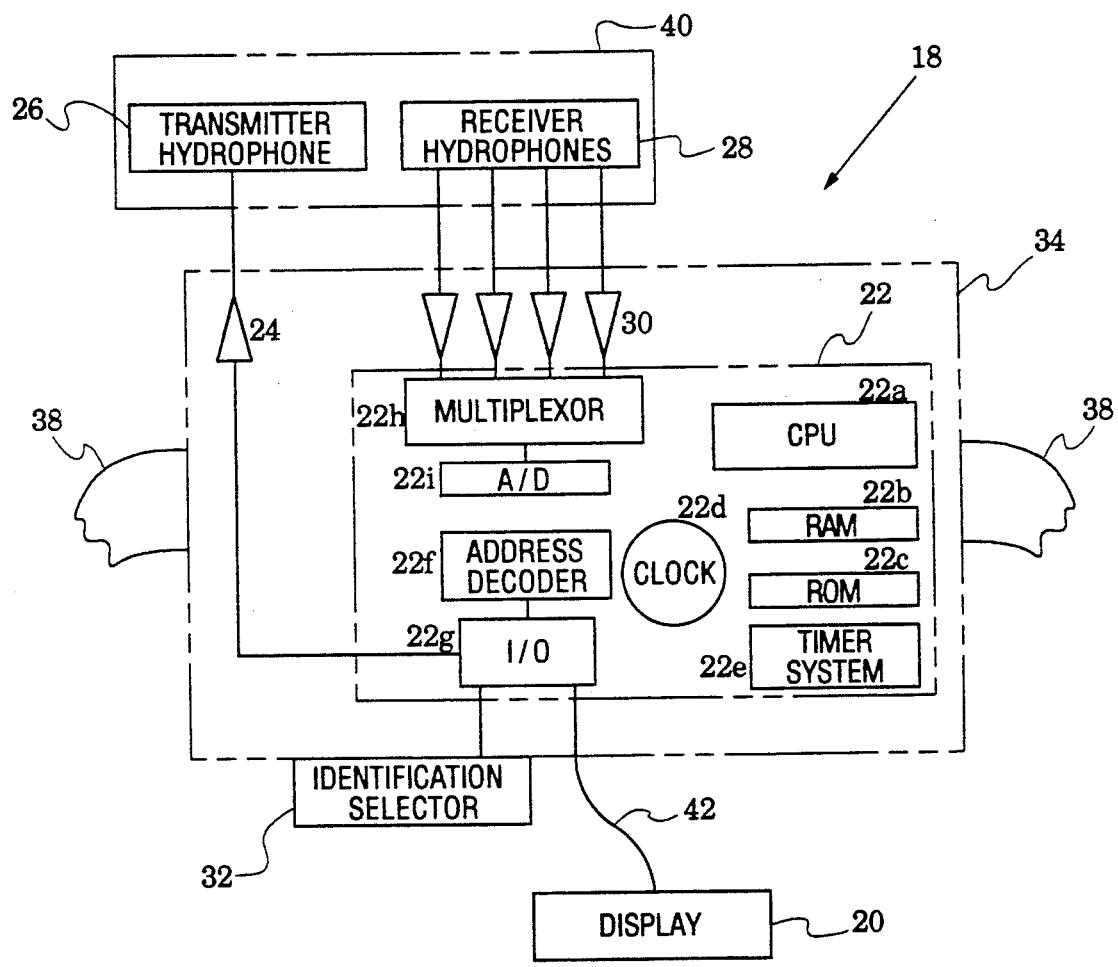
FIG. 2 is a block diagram of one of the locator modules of FIG. 1.

In a preferred embodiment illustrated in the block diagram of FIG. 2 (with references to FIG. 1), a locator module 18 has processing means in the form of a microcontroller 22 (with component parts well known in the art including a CPU 22a, memory in the form of a RAM 22b and a ROM 22c, clock 22d, timer system 22e and address decoder 22f) and a transmitter amplifier 24 to transmit an acoustic interrogation pulse via an transmitter hydrophone 26 (the hydrophone 26 is preferably omnidirectional).

When acting as a transponder to an acoustic interrogation pulse, the locator module 18 receives the interrogation pulse through receiver hydrophones 28 and associated receive amplifiers 30 and transmits an acoustic response pulse via the transmit amplifier 24 and hydrophone 26. The response pulse is coded by inserting a time delay, unique to each locator module 18, between the receipt of the interrogation pulse and the initiation of the response pulse. This unique time delay is assigned (e.g. prior to a dive) to each locator module by means of an identification selector 32 (the selector may be any suitable input device, e.g. multiposition switch, buttons) interfacing with the input/output (I/O) 22g of the microcontroller 22.

Response pulses from locator modules are sent to the microcontroller 22 from four spaced portions of the receiver hydrophones 28. Because of its unique time delay, each response pulse resides in a unique time window and can thus be identified by the microcontroller 22 which has all possible predetermined time delays stored in its memory.

Once the response pulse has been identified, the microcontroller 22 calculates range and bearing and sends this information, via the I/O 22g, to be displayed on the console 20 by appropriate positioning thereon of a symbol associated with the time delay assigned to each transponder source.

For environmental protection, the electronic circuits of the locator module 18 are mounted in an enclosure 34 which is secured to the diver's tank 36 by straps 38, or alternatively secured by a suitable fastener to the diver's regulator, air hose or other equipment carried by the diver. The transmitter hydrophone 26 and receive hydrophones 28 are tethered above the tank 36 in a housing 40 (generally indicated as the transducer 21 in FIG. 1) while the console 20, connected by a cable 42 to the housing 34, may be hand held or mounted in a diver's instrument console.

Figure 3:
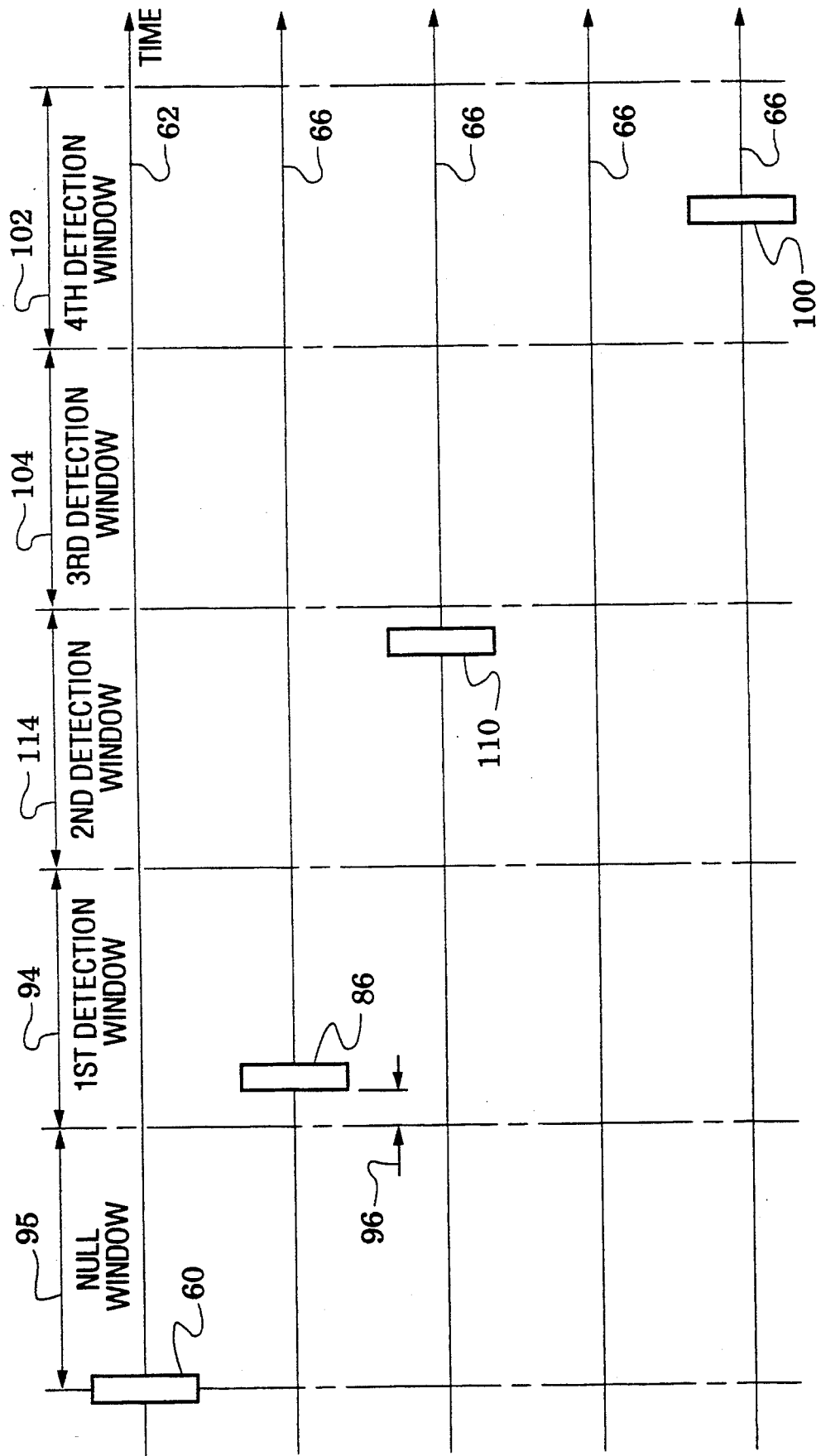
FIG. 3 illustrates the timing relationship between an interrogation pulse and resultant transponder pulses in the system of FIG. 1.
Figure 4:
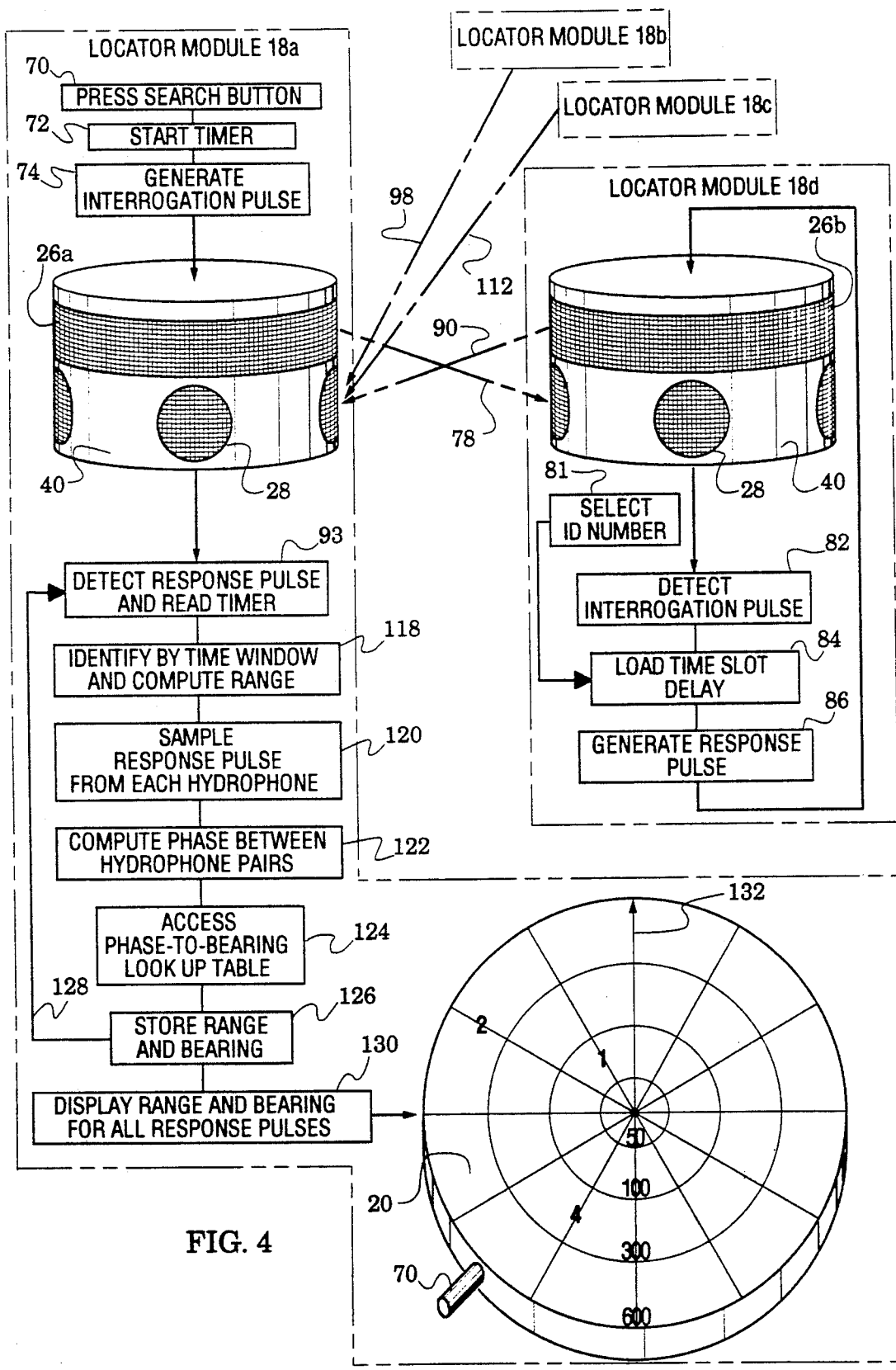
FIG. 4 is a flow diagram of the system of FIG. 1.

The underwater locator system 16, using the locator module illustrated in FIG. 2, may be described in greater detail by reference to the system timing diagram of FIG. 3 and the system flow diagram of FIG. 4. FIG. 3 illustrates time relationships between an interrogation pulse and resultant response pulses while FIG. 4 illustrates the functional sequence of the system 22 leading to graphic display of range and bearing on the console 20. The functional steps of the flow diagram are implemented by a program stored in the memory (i.e. RAM 22b and ROM 22c) of the microcontroller 22 shown in FIG. 2.

For illustrative purposes let it be assumed that, prior to the dive illustrated in FIG. 1, the identification selector 32 on each diver locator module (18a, 18b, 18c and 18d) was used to assign the following identification: diver 10a—number 3; diver 10b—number 4; diver 10c—number 2; and the boat 14—number 1.

FIGS. 3 and 4 illustrate the system sequence when diver 10a chooses to interrogate the other locator modules to determine their location. In FIG. 3, the resulting interrogation pulse 60 from the locator module 22a is shown on the time abscissa 62. For clarity of illustration each response pulse is shown on a separate time abscissa 66. The following description refers to FIGS. 1, 2, 3 and 4 with reference to functional steps shown in the task blocks of FIG. 4.

The functional sequence begins when diver 10a presses the search button 70 (task block 70) on his console 20 in FIG. 3. This starts a timer (task block 72) and generates an interrogation pulse (task block 74) which is transmitted through the hydrophone 26a.

The interrogation pulse (60 in FIG. 3) travels along path 78 to the locator module 18d where it is received in receive hydrophones 28 in the housing 40. As stated above, previous to the dive, the identification number 1 was selected (task block 81), through the identification selector 32, for the locator module 18d. Therefore, after the interrogation pulse is detected (task block 82), the locator module 18d loads (task block 84) the unique time delay associated with its identification which is 250 milliseconds in the system 16. After this time delay the locator module 18d generates a response pulse (task block 86) which is sent out through its hydrophone 26b along path 90 to the locator module 18a receive hydrophones 28 to be detected and timed (task block 93). Each of the receive hydrophones 28 is positioned in a different quadrant of the housing 40.

The response pulse 86 is shown in the timing diagram of FIG. 3 to arrive at the locator module of diver 10a early in the first window 94 of a series of consecutive time detection windows. The duration of the detection windows is selected to be the extreme detection range of the system 16 embodiment of the invention.

In the system 16, the detection window duration is set at 250 milliseconds which represents a range in sea water of approximately 600 feet (two way travel at approximately 4800 feet/second). No response pulses past this range will exceed the detection threshold of the locator modules 18. The initial 250 milliseconds after the interrogation pulse generation is reserved as a null window 95 so that the system 16 is insensitive to echoes from the interrogation pulse (e.g. reflection off of the diver 10a). Other embodiments of the invention having different sensitivities may employ different detection window durations.

The time delays associated with the identification selected on each locator module are predetermined to establish consecutive detection windows (after the initial null window 95) which are defined between pairs of time delays closest in magnitude. Thus module number 1 stores a 250 milliseconds delay, module number 2 stores a 500 milliseconds delay, module number 3 stores a 750 milliseconds delay, etc. and a detection window is defined between 250 milliseconds and 500 milliseconds, between 500 milliseconds and 750 milliseconds, etc. Since the locator module 18d is relatively close to diver 10a, the response pulse 86 arrives early in the first detection window 94. The receipt time 96, within the detection window 94, represents the combined transit time of the interrogation pulse 60 and the response pulse 86.

In a similar process as that described above, the locator module 18b on diver 10b will send a response pulse along the path 98 (FIG. 4). Since diver 10b entered identification number 4 into his module 22b, a delay of one second is inserted before a response pulse is generated. Thus the response pulse 100 from module 18b arrives at the locator module 10a in the fourth detection window 102 of FIG. 3. The pulse 100 arrives in the middle of the window indicating that diver 10b is at at mid-range.

Since diver 10a was assigned number 3 prior to the dive, there will not be a response pulse in the third time window 104 because the locator module ignores its own interrogation. Diver 10c was identified as number 2 and so his response pulse generation is delayed 500 milliseconds and the resultant response pulse 110 travels along path 112 (FIG. 4) to arrive in the second detection window 114 of FIG. 3. Because diver 10c is at extreme range his response pulse 110 is located late in the detection window 114.

Once the response pulses (and thereby their sources) have been identified by association with the detection window in which they were received, a receipt time is obtained for each responding transponder similar to the receipt time 96 shown in the first detection window. The microcontroller 22 derives the range of each responding transponder by calculating one half of the product of the associated receipt time and the speed of sound in sea water (task block 118 of FIG. 4).

To resolve the bearing of received and identified response pulses, the sinusoidal output of each receive hydrophone 28 is sampled (task block 120) and compared in a least squares fit with a stored sinusoid of the transmitted acoustic frequency to obtain an estimate of the relative phase between receive hydrophones. Tables to speed up this calculation are stored in memory for access by the microprocessor. The microcontroller 22 then determines the phase between pairs of the receive hydrophones 28 (task block 122).

A stored phase-to-bearing lookup table is accessed (task block 118) and the derived bearing is stored along with the range previously calculated (task block 126). As indicated by the return loop 128 in FIG. 4, this identification and bearing and range calculation is performed for each received response pulse after which their range and bearing is displayed (task block 130) on the console 20.

A unique symbol is assigned each response pulse source and displayed with range expressed as radial distance from the display center and bearing expressed as radial direction. Concentric circles on the console 20 are marked with range expressed in feet. The radial arm 132 of the console display terminates in an arrowhead to indicate straight ahead direction to the diver 10a.

In the system embodiment 16 each source is represented by the number selected prior to the dive in the identification selector (32 in FIG. 1). Thus, with range corresponding to the time window positions of FIG. 3 and bearing as given by accessing the phase-to-bearing lookup table (task block 118 of FIG. 4), the number 1 is positioned on the console display 20 to show that the boat 14 is nearby and at approximately "11 o'clock". Similarly the numbers 2 and 4 are positioned to show, respectively, that diver 10c is far away at approximately "10 o'clock" and diver 10b is at mid range and approximately "7 o'clock".

Figure 5:
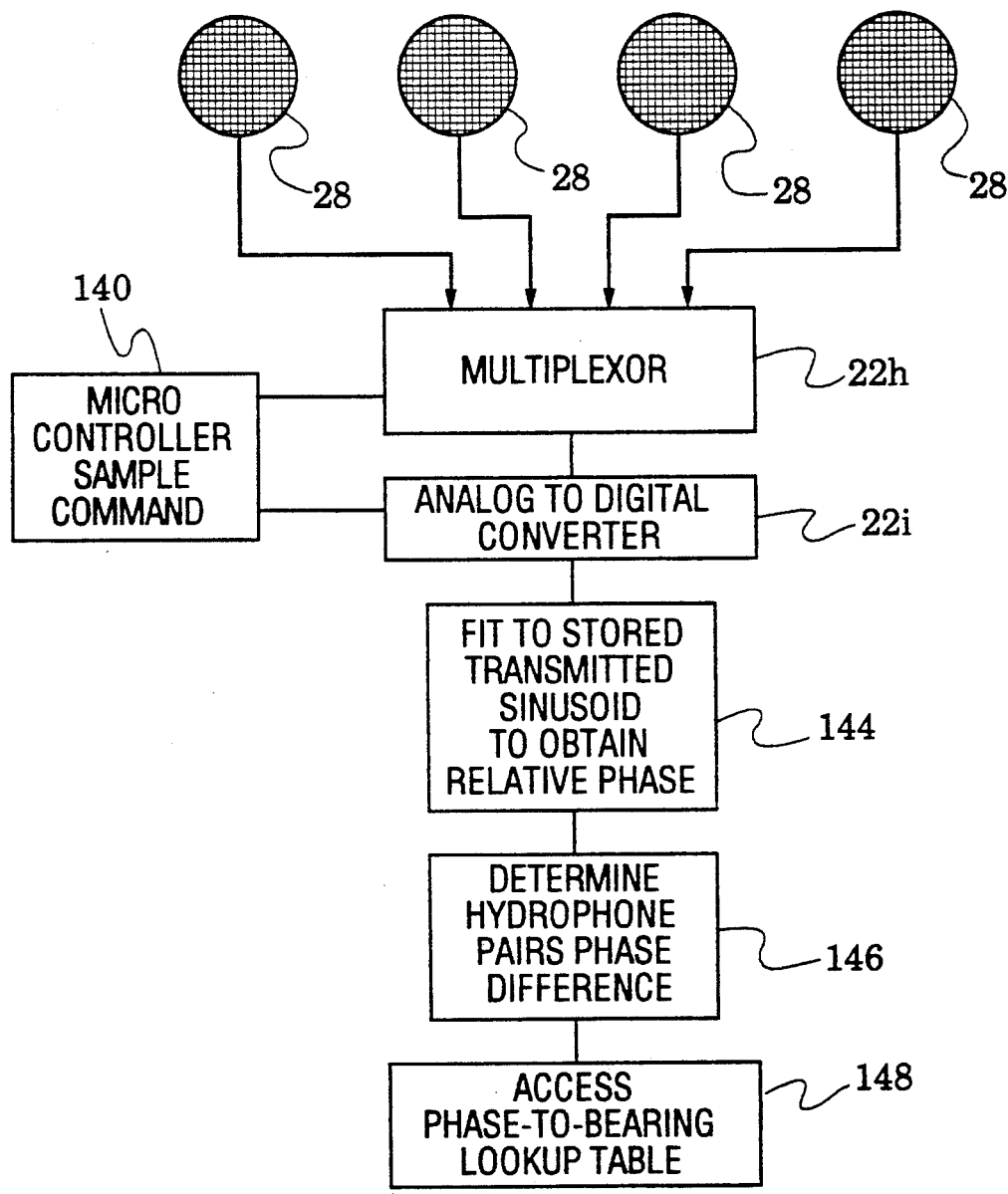
FIG. 5 is a detail of one portion of the flow diagram of FIG. 4.

Task blocks 120, 122 and 118 of FIG. 4 are further illustrated in the flow diagram of FIG. 5 which illustrates that the response pulses from each receive hydrophone 28 are directed, under command of the microcontroller 22, through the multiplexor 22h to an analog to digital converter 22i where they are consecutively sampled.

The samples are fitted to the stored transmitted sinusoid (task block 144) to obtain relative phase. Other preferred embodiments of the invention may use other phase comparison techniques well known in the art (e.g. find crossover points of the sampled sinusoid and time shift to obtain coincidence). The phase difference is then determined between pairs of hydrophones (task block 146) and fitted in a least squares method with the stored phase-to-bearing lookup table to derive bearing of the response pulse source (task block 148).

In the module embodiment 18 illustrated in FIG. 2, the receive hydrophones are located in each quadrant of the housing 40 (best seen in FIG. 4) and are arranged in a coplanar relationship. The relative phase of each hydrophone versus bearing of a response pulse with this arrangement of hydrophones has been calculated and verified through actual measurements on a prototype immersed in a tank. Finer bearing resolution is stored in the phase-to-bearing lookup table (task block 118 in FIG. 4) than the desired display resolution on the console 20 in FIG. 4 (e.g. the system embodiment 16 has a bearing resolution of 5° stored in the phase-to-bearing table and a 30° display resolution on the console).

Other preferred embodiments of the invention may use different arrangements of a plurality of receive hydrophones for which the relative phase versus bearing has been obtained and stored. The hydrophones may be constructed with any acoustic transducer suitable for underwater use (e.g. piezoelectric film) and the transmitted acoustic frequency selected for compatibility. The console 20 shown in FIGS. 1 and 4 may be fabricated with a liquid crystal display or other structures suitable for underwater use. Locator modules used only in the transponder mode (e.g. module 18d on the boat 14 and the modules 18 on the sea floor 12 of FIG. 1) do not require a display 20. The identification selector 32 (see FIG. 2) could be eliminated if it were desired to supply locator modules with preset time delays (e.g. in a set of locator modules).

From the foregoing it should now be recognized that an underwater locator system embodiment has been disclosed herein especially suited to be carried by individual scuba divers for display of the range and bearing of other divers and selected underwater locations.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A locator module physically configured to be carried by a first underwater diver for displaying the location relative to said locator module of each of a plurality of transponders respectively carried by other divers, where each transponder transmits a unique time delay encoded response pulse in response to an interrogation pulse from said locator module, said locator module comprising:

transmitter means for transmitting a substantially omnidirectional interrogation pulse;

a plurality of spaced receiver means for receiving said unique time delay encoded response pulses transmitted by said transponders;

processor means responsive to each response pulse received by said receiver means for identifying the transponder from which the response pulse was transmitted and for determining the range and bearing of the identified transponder relative to said locator module; and display means for displaying the range and bearing determined for each identified transponder.

2. The locator module of claim 1 wherein said processor means comprises:

first timer means for defining successive time detection windows, each window being uniquely associated with a different one of said transponders; and means for identifying a responding transponder based on the particular detection window during which a response pulse is received.

3. The locator module of claim 2 wherein said processor means further comprises:

means for determining the receipt time of a response pulse within a detection window; and means responsive to the determined receipt time for determining the range of the transponder from which the response pulse was received, relative to said locator module.

4. The locator module of claim 1 wherein said processor means includes:
   means for determining the phase relationship between a response pulse as received respectively at said plurality of receiver means; and
   means responsive to said determined phase relationship for determining the bearing of the transponder from which the response pulse was received relative to said locator module.

5. The locator module of claim 4 wherein said means for determining the bearing includes means for accessing a stored phase-to-bearing lookup table.

6. The locator module of claim 1 wherein each of said receiver means comprises a hydrophone; and
   means mounting said hydrophones around a substantially 360° perimeter with each hydrophone oriented toward a unique portion of said perimeter.

7. The locator module of claim 1 including a transducer housing defining a substantially 360° perimeter;
   said transmitter means comprising a piezoelectric film mounted around said housing perimeter;
   each of said receiver means comprising a piezoelectric film; and wherein
   said plurality of receiver means are mounted around said housing perimeter each directed toward a unique portion thereof.

8. The locator module of claim 1 wherein said display means includes means representing the location of said locator module on a two dimensional display field; and
   means representing each identified transponder by a unique symbol on said display field positioned at a distance and angle relative to said represented locator module location corresponding to the determined range and bearing for each such transponder relative to said locator module.

9. A system including a plurality of substantially identical locator modules, each physically configured to be carried by a different underwater diver for enabling each diver to transmit an interrogate pulse to locate each other diver, each locator module comprising:
   a transmitter transducer;
   a plurality of physically spaced receiver transducers;
   means for driving said transmitter transducer to transmit a substantially omnidirectional interrogate pulse;
   means coupled to said receiver transducer for detecting receipt of an interrogate pulse from a remote locator module;
   means responsive to receipt of an interrogate pulse for driving said transmitter transducer to transmit a unique time delay encoded response pulse;
   processor means responsive to each response pulse received by said receiver transducers for identifying the responding remote locator module transmitting that response pulse and for determining the range and bearing of that identified locator module relative to the locator module source of said interrogate pulse; and
   means for displaying the range and bearing of each identified responding locator module.

10. The system of claim 9 wherein said processor means comprises:
    first timer means for defining successive time detector windows, each window being uniquely associated with a different one of said plurality of locator modules; and
    means for identifying a responding locator module based upon the particular detection window during which a response pulse is received by said receiver transducers.

11. The system of claim 10 wherein said processor means further comprises:
    means for determining the receipt time of a response pulse within a detection window; and
    means responsive to the determined receipt time for determining the range of the responding locator module, relative to the locator module source of said interrogate pulse.

12. The system of claim 9 wherein said processor means includes:
    means for determining the phase relationship between a response pulse as received respectively at said plurality of receiver means; and
    means responsive to the determined phase relationship for determining the bearing of the responding locator module relative to the locator module source of said interrogate pulse.

13. The system of claim 12 wherein said means for determining bearing includes means for accessing a stored phase-to-bearing lookup table.

14. The system of claim 9 wherein each of said plurality of receiver transducers comprises a hydrophone; and
    means mounting said hydrophones around a substantially 360° perimeter with each hydrophone oriented toward a unique portion of said perimeter.

15. The system of claim 9 including a transducer housing defining a substantially 360° perimeter;
    said transmitter transducer comprising a piezoelectric film mounted around said housing perimeter;
    each of said receiver transducer comprising a piezoelectric film; and wherein
    said plurality of receiver transducers are mounted around said housing perimeter each directed toward a unique portion thereof.

16. The system of claim 9 wherein said display means includes means representing the locator module source of said interrogate pulse on a two dimensional display field; and
    means representing each identified responding locator module by a unique symbol on said display field positioned at distance and angle, relative to said represented locator module source, corresponding to the determined range and bearing for each locator module relative to the locator model source of said interrogate pulse.

17. The system of claim 9 wherein each locator module includes means for inserting a unique time delay between receipt of an interrogate pulse and the transmitting of a response pulse.

18. A method of enabling a first underwater diver to locate each of a plurality of other divers comprising the steps of:
    enabling said first diver to transmit a substantially omnidirectional interrogate pulse;
    causing each of said other divers to transmit a unique time delay encoded response pulse in response to said interrogate pulse;
    receiving at said first diver each of said unique time delay encoded response pulses;
    processing at said first diver each response to identify the source thereof and the range and bearing of each identified source relative to said first diver; and displaying at said first diver the identity of each identified pulse source and its range and bearing relative to said first diver.

19. The method of claim 18 wherein said step of causing each of said other divers to transmit a unique time delay encoded response pulse includes the step of inserting a unique time delay between receipt of said interrogate pulse and transmittal of said response pulse.

* * * * *